Jan. 10, 1961 G. V. MOORE 2,967,737
DETACHABLE TRACTION UNITS
Filed Nov. 30, 1959 2 Sheets-Sheet 1
FIG. 1.
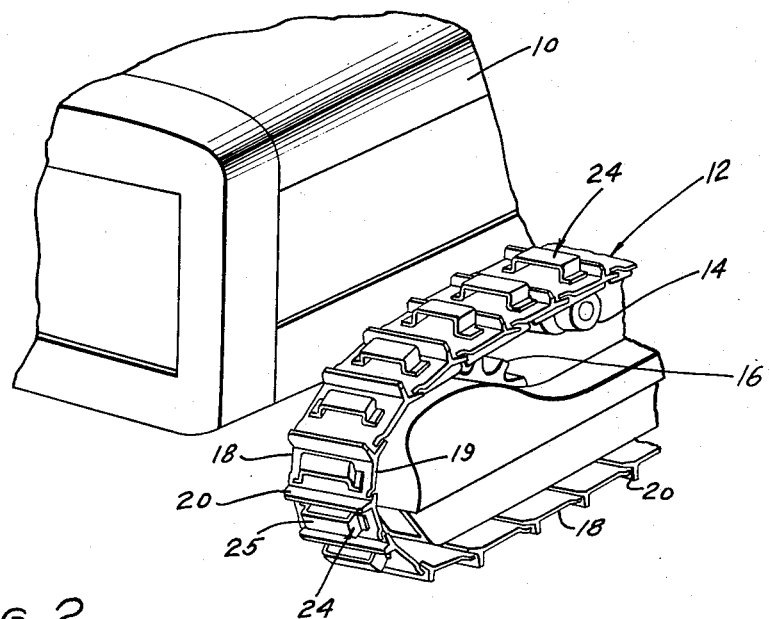
FIG. 2.
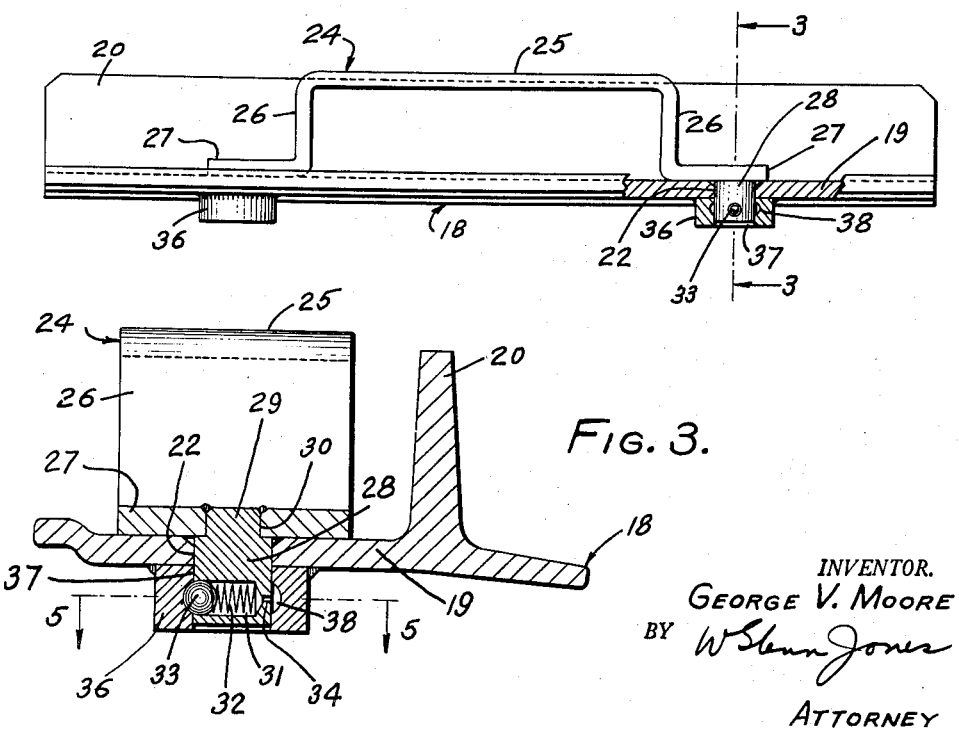
FIG. 3.
INVENTOR.
GEORGE V. MOORE
BY *W Glenn Jones*
ATTORNEY Jan. 10, 1961 G. V. MOORE 2,967,737
DETACHABLE TRACTION UNITS
Filed Nov. 30, 1959 2 Sheets-Sheet 2
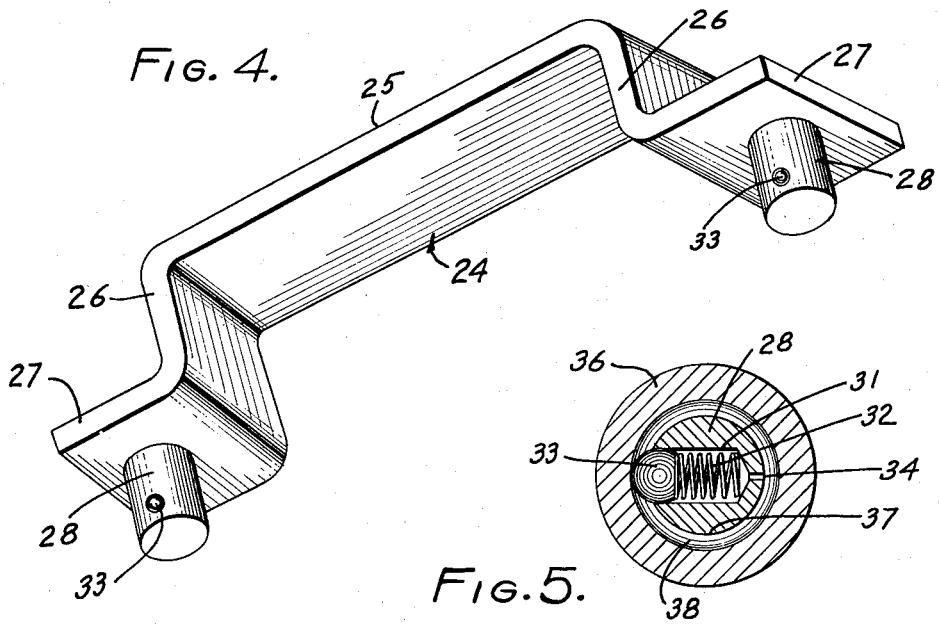
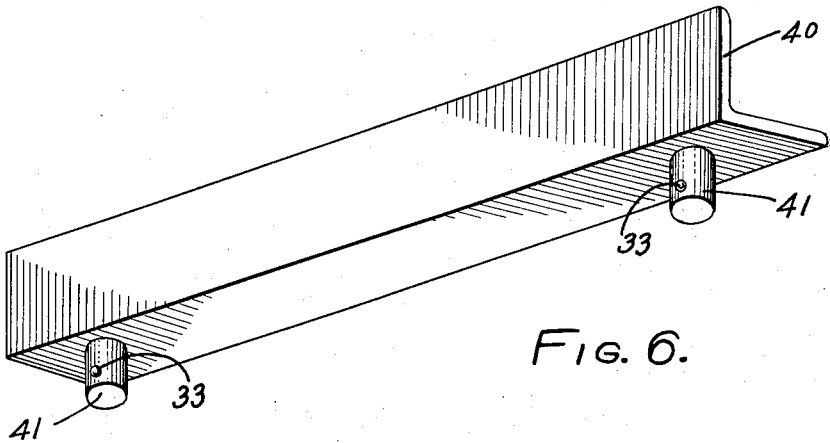
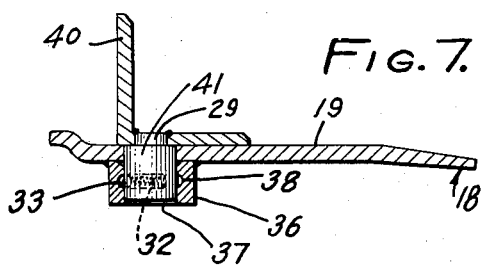
INVENTOR.
GEORGE V. MOORE
BY W. Glenn Jones
ATTORNEY United States Patent Office 2,967,737
Patented Jan. 10, 1961

2,967,737
DETACHABLE TRACTION UNITS
George V. Moore, 1004 Laurel Road, Santa Paula, Calif.
Filed Nov. 30, 1959, Ser. No. 856,311
4 Claims. (Cl. 305—51)
(Granted under Title 35, U.S. Code (1952), sec. 266)

The invention described herein may be manufactured and used by or for the Government of the United States of America for governmental purposes without the payment of any royalties thereon or therefor.

This invention relates generally to improvements in quickly attachable-detachable traction units which are adapted for use in connection with the endless tracks of certain types of tractors. The invention is directed particularly to street plates and traction cleats or lugs which may be quickly employed on the standard track or grouser plates making up the endless track as supplied with the tractor and as quickly removed therefrom.

The usual endless tracks supplied with such tractors comprise a plurality of grouser plates secured to one or more heavy link endless sprocket chains which turn over power driven sprocket wheels at each end of the machine. The grouser consists of a generally flat plate with an outwardly extending cleat or lug usually formed integrally with the flat plate portion. When the tractor is run over pavement or over stony ground, it is customary to place a street shoe or plate on each grouser so as to prevent the grouser cleat or lug from digging into and marking the pavement and also to prevent the cleat from damage.

Ordinarily, these street shoes are bolted to each of the grousers and, as can readily be seen, in large tractors, such an operation is time-consuming, tedious, and arduous. Where the tractor is only to be moved a short distance over pavement or rough ground, such as operation becomes expensive and annoying. With my invention, however, the emplacement and removal of street plates becomes but a matter of minutes resulting in a material saving in time and labor charges.

Where the tractor is to be operated in soft ground or snow, the single cleat on each grouser may be insufficient to afford good traction. Extra bolted-on cleats have heretofore been provided to meet such conditions. Again, the application and later removal of such extra cleats or lugs has been time-consuming. Where normally flat tracked tractors which are used for moving heavy equipment on pavements, wooden or metal causeways, or over stony ground are desired for use in soft ground, the bolting on of the grouser cleats has taken too much time. In military operations, particularly, these conversions must be made quickly as time is usually of the essence.

Some prior art detachable fittings have included a fastening means consisting of hooks adapted to fit over the longitudinal edges of the grouser or track plates. Such fittings have proven impracticable as the grousers are susceptible to some disfiguration through use, the longitudinal edges become nicked and distorted, and the hooks of the fittings can no longer be applied thereto.

The principal object of my invention, therefore, is to provide quickly attachable-detachable traction units for timely application to the endlessc tracks of certain types of tractors.

Another object of my invention is to provide quickly attachable-detachable traction units which may enable a rapid conversion of one form of tractor to another thus saving time, money and capital expenditure for a considerable number of special purpose tractors.

Further objects and advantages of my invention will be appreciated and understood in view of the following description and drawings wherein:

Figure 1 is a partial view in perspective of a tractor with part of one endless track;

Fig. 2 is an elevation showing my improved street plate secured in place on its corresponding grouser;

Fig. 3 is a sectional view taken on the line 3—3 of Fig. 2;

Fig. 4 is a perspective view of my improved street plate;

Fig. 5 is a sectional view of a detail of my invention;

Fig. 6 is a perspective view of my improved cleat; and

Fig. 7 is a sectional view of my improved cleat as detachably secured to its corresponding track plate.

With reference to Fig. 1, the body of the tractor is indicated by the character 10. Endless track 12 is supported on rollers 14 and is caused to turn in either a forward propelling direction or a backward propelling direction by means of sprocket wheel 16. The endless track 12 comprises a heavy link belt or chain (not shown) to which the usual grouser plates or grousers 18 are pivotally and relatively permanently attached. As shown, these grousers 18 are formed of a relatively flat plate 19 extending in the general plane of the track and a cleat or lug portion 20 extending outwardly therefrom. As shown the leading edge of each grouser may be formed to overlap the trailing edge of the grouser ahead of it so as to present a fairly unbroken surface when the track is passing over the sprocket wheel. Normally, these grousers are cast or forged into the shape shown so that cleat 20 is integrally formed with the flat plate 19.

As illustrated in Fig. 2, these grousers are supplied with a transverse row of chamfered bolt holes 22. Usually only two holes are supplied, but more may be furnished, depending on the width of the grouser. These holes are supplied for the purpose of bolting on the various street plates, extra cleats, or other traction units which may be procured. As will be more fully described hereinafter, these chamfered bolt holes 22 will be utilized in the use of my invention.

Street shoe 24 is cast or forged generally in a U-shaped form having a comparatively extensive horizontal, flat pavement engaging surface 25, a pair of vertically extending end walls 26 and laterally extending flanges 27. It will be noted, as indicated in Fig. 2, the height of end walls 26 is such that the street shoe flat surface 25 is somewhat higher than the elevation of cleat 20. Thus as the tractor with its street shoes in place moves over the pavement or rough ground, cleats 20 are prevented from marking the pavement or being damaged by the rough ground.

As shown in Figs. 2 and 3, flanges 27 are provided with downwardly extending cylindrical studs 28. These latter are provided with a reduced portion 29 which fits tightly into holes 30 formed in the flanges 27. These reduced portions 29 may be welded in place, as shown, or otherwise tightly secured. Studs 28 are of a size to fit snugly into the holes 22 already provided in the grouser. In the lower portion of stud 28, a partial transverse diametrical bore 31 is provided which serves as a housing for the compression spring 32 and detent ball 33. The outer rim of the bore 31 adjacent to the detent ball 33 is peaned over after assembly so as to prevent the ball from falling out when the street shoe is removed from the grouser. Small hole 34 at the other end of bore 31 may be concentric therewith and is provided for the introduction of oil or other lubricating compound which lubricating compound not only affords lubrication but serves to prevent dirt and water from entering bore 31.

Keeper rings 36 may be welded or otherwise suitably secured to the bottom or lower surface of the flat plate portion 19 of the grouser or track plate 18. These rings are provided with a central aperture or bore 37 which is of the same size as the chamfered bolt hole 22 and is mounted concentrically therewith. Each keeper ring is furnished with an internal annular groove 38, positioned and adapted to receive the spring-loaded detent ball 33. Thus, when stud 28 is introduced into hole 22 and passes through the keeper ring bore 37, the detent ball is depressed until, when the stud is pressed home and the lower surfaces of the traction unit are resting on the upper surface of grouser plate portion 19, detent ball 25 is extended by means of the compression spring 32 into the annular groove 38. This latter action results in the traction unit being securely, but removably, held to the track grouser or track plate.

Figs. 6 and 7 illustrate another form of traction unit which may similarly be applied to the standard grouser plate. The traction unit here disclosed is in the form of an additional lug or cleat which may be applied to afford increased traction in soft mud, wet sand, or snow. The cleat or lug 40 is formed from heavy gauge angle iron and is supplied with two or more studs 41 which are similar in all respects to the studs 28 described with relation to the street plate or shoe 24. The keeper rings 36 are those previously described. Thus, cleat 40 may be snapped into place in holes 22 and keeper ring bores 37 instead of the street shoe heretofore described.

From the foregoing description, it will be obvious that my improved "snap-on" street shoe and cleat will enable such tractors to be converted readily and quickly from one usage to another. The time-consuming and expensive operation of bolting such traction units in place and then the equally time-consuming operation of removal of all the bolts has been eliminated. Furthermore, where flat-track or crawler-type tractors having flat plates are being used, my quickly attachable-detachable "snap-on" lug or cleat can be readily applied for converting such crawler type tractor to use in soft ground, mud, sand or snow.

Having thus described and illustrated my invention, I claim:

1. Accessory traction units for use with the endless tracks of a tractor where said endless tracks consist of a plurality of segmented track plates having upper and lower surfaces and a transverse row of bolt holes formed therein, each traction unit comprising:

a generally raised portion extending upwardly from a generally planar base portion;

a plurality of studs depending downwardly from said planar base portion and adapted to fit into said bolt holes in said track plates;

fastening means secured to the lower surfaces of said track plates concentric with said bolt holes; and means carried by said studs for cooperating with said fastening means whereby said traction units may be securely attached to the upper surfaces of said track plates and, by the application of force applied in a direction normal to the upper surfaces of said track plates, may be removed therefrom.

2. Accessory traction units as claimed in claim 1 wherein said fastening means comprises a keeper ring having a bore of the same size and concentric with each of said bolt holes in said track plates and an annular internal groove formed in said bore; and said means carried by said studs comprises a spring-loaded detent housed in a diametrical transverse bore in the lower end of said stud, said detent being adapted for reception into said annular internal groove in the bore of said keeper ring.

3. An accessory traction unit as claimed in claim 1 wherein said generally raised portion extending upwardly from a generally planar base portion consists of a pavement protective street shoe formed of a strip of metal having a raised central portion and a planar base portion in the form of laterally extending end flanges.

4. An accessory traction unit as claimed in claim 1 wherein said generally raised portion extending upwardly from a generally planar base portion consists of a traction cleat extending transversely of said track plate, said cleat having a first leg extending normally upward from the upper surface of said track plate and a second horizontal leg overlying said track plate.

References Cited in the file of this patent

UNITED STATES PATENTS

| | | |
|---|---|---|
| 2,294,409 | Kohn | Sept. 1, 1942 |

FOREIGN PATENTS

| | | |
|---|---|---|
| 483,447 | Great Britain | Apr. 20, 1938 |
| 968,280 | France | Apr. 12, 1950 |
| 1,028,398 | France | Feb. 25, 1953 |
| 513,975 | Italy | Feb. 8, 1955 |